(12) United States Patent
Cosciani (10) Patent No.: US 6,591,539 B2
(45) Date of Patent: Jul. 15, 2003

(54) DECOY AND MOVEMENT SYSTEM FOR THE SAME

(76) Inventor: Roberto Cosciani, 1 The Firs, Market Harborough, Leicestershire LE16 9BW (GB)

( * ) Notice: Subject to any disclaimer, the term of this patent is extended or adjusted under 35 U.S.C. 154(b) by 0 days.

(21) Appl. No.: 09/944,286

(22) Filed: Aug. 30, 2001

(65) Prior Publication Data

US 2003/0019142 A1 Jan. 30, 2003

(30) Foreign Application Priority Data

Jul. 27, 2001 (GB) .............................. 0118359

(51) Int. Cl.⁷ .............................. A01M 31/06
(52) U.S. Cl. .............................. 43/2
(58) Field of Search .............................. 43/3, 2

(56) References Cited

U.S. PATENT DOCUMENTS

| | | | |
|---|---|---|---|
| 2,953,869 A | * | 9/1960 | Collischan ............ 43/2 |
| 4,612,722 A | | 9/1986 | Ferrell |
| 5,036,614 A | | 8/1991 | Jackson |
| 5,289,654 A | | 3/1994 | Denny et al. |
| 5,809,683 A | | 9/1998 | Solomon |
| 5,926,990 A | | 7/1999 | Okimoto |
| 5,960,577 A | * | 10/1999 | Walterson ............ 43/3 |
| 6,070,356 A | | 6/2000 | Brint et al. |
| 6,212,816 B1 | | 4/2001 | Babbitt et al. |
| 6,321,480 B1 | * | 11/2001 | Solomon ............ 43/3 |
| 6,339,894 B1 | * | 1/2002 | Solomon ............ 43/3 |
| 2001/0001913 A1 | | 5/2001 | Mathews |

FOREIGN PATENT DOCUMENTS

GB    431190    6/1935

* cited by examiner

*Primary Examiner*—Charles T. Jordan
*Assistant Examiner*—Susan C. Alimenti
(74) *Attorney, Agent, or Firm*—Needle & Rosenberg, P.C.

(57) ABSTRACT

A decoy and method of moving a decoy, the decoy having a body and a movement system for causing the decoy to move. The movement system comprising guide element and guide track for receiving the element connected to the body and a motor for driving the guide element and track so as to impart movement to the body in at least two directions simultaneously.

4 Claims, 7 Drawing Sheets

DECOY AND MOVEMENT SYSTEM FOR THE SAME

This application claims priority to Great Britain Application GB 0118359.9 filed Jul. 27, 2001, which application is herein incorporated by reference in its entirety.

This invention relates to decoys in the form of birds or other animals; more particularly, it relates to a movement system for such a decoy, which system imparts motion in a plurality of directions, so as to simulate actions for example feeding.

Hunters, photographers and participants in shooting sports use decoys to represent birds and other animals, so as to attract their quarry. Decoys may be water-borne, or may stand on solid ground. They may be motorised, or may simply move by natural wind power. Some such decoys have been developed to function by remote control.

Many patents exist for decoys, both animated and non-animated, which cover a variety of different approaches. For example, U.S. Pat. No. 5,926,990 to Okimoto discloses a bird decoy movement system which imparts oscillatory motion in one plane.

U.S. Pat. No. 6,212,816 B1 to Babbit et al, shows an oscillating mechanism for motion in one plane, horizontal to the ground.

U.S. patent application Ser. No. 2001/0001913 A1 to Mathews utilizes a motor or natural wind power to impart motion to the wind members of a decoy.

Generally, the decoy movement associated with the prior art tends to be restricted which leads to a very limited and often repetitive form of simulated motion, often mimicking only a single action. This limitation of the decoy's movements may limit the scope of the decoy's use—the limited or regular movement may scare away the animals that the user wishes to attract, or may fail to have any positive effect whatsoever.

Those systems which do seek to impart more life-like motion to a decoy are often so complex as to make them unreasonably expensive to produce—and thus expensive to the customer.

This invention seeks to overcome or at least mitigate the problems of the prior art, offering a solution to the development of a mechanically simple and therefore inexpensive movement system, which allows life-like movement of a decoy in a plurality of directions.

One aspect of the invention provides a decoy having a body and a movement system for causing the decoy to move. The movement system comprises guide means connected to the body and drive means for driving the guide means so as to impart movement to the body in at least two directions simultaneously.

According to an optional feature of this aspect of the invention, the guide means may comprise a guide element and guide track for receiving the element and drive means is adapted to drive the guide track and guide element.

Optionally, the drive means comprises a rotary motor and an output arm adapted to be received by the guide track, whereby the rotary motion of the arm imparts a linear motion to the guide track. Preferably, the guide track is fixed to a pivot so that the arm imparts an oscillatory motion to the guide track.

According to an optional feature of this aspect of the invention, the guide track further comprises a slot for receiving the output arm to protrude there through to cause the guide element to move relative to the guide track.

In one class of embodiments, the guide element is pivotally connected to the guide track and wherein the output arm moves along a path on the guide element to cause the guide element to move in an oscillatory manner about the pivot. Preferably, the guide element and body moves from a horizontal plane in an upward and downward directions about the pivot to simulate a nodding motion for the decoy In another class of embodiments, the output arm is engaged by the guide element to cause it to move to and fro along the guide track.

The guide element may further comprise a protruding portion extending transversely and adapted to move along an edge of the guide track, the edge may be profiled to cause the protruding portion and part of the guide element to move relative the guide track in a direction corresponding to the profile. Preferably, the protruding portion may be positioned to the rear of the guide element and the edge is profiled to cause the rear of the guide element to rise relative the front of the guide element as it moves towards the front of the guide track and to be lowered in the return direction so as to simulate a feeding motion for the body.

According to an optional feature of the invention, the decoy may further comprise wings connected to the body, and the guide element further comprises a toothed rack to engage a cog arrangement secured to the guide track and connecting the wings to cause them to move.

Optionally, the movement system is mounted on means to allow it to stand on solid ground. Alternatively, the movement system is mounted on floatation means, thereby allowing the decoy to operate on water.

Exemplary embodiments of the invention will now be described, by way of example only, with reference to the accompanying drawings in which.

Figure 14:
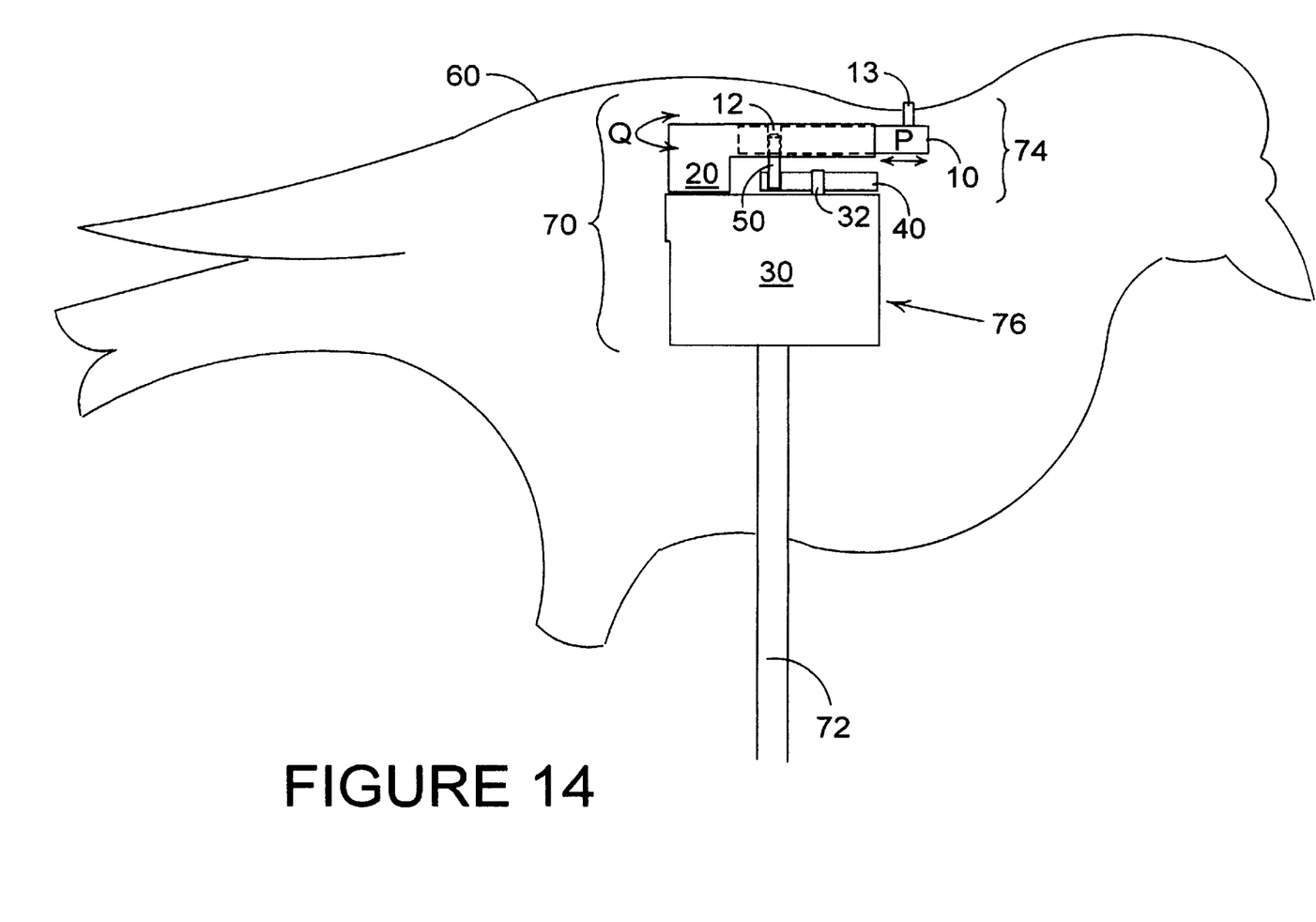
FIG. 14 shows how a movement system, according to any of the embodiments, may be fitted to the body of a decoy.

Referring to the drawings and in particular FIG. 14, there is shown a decoy which is adapted to move. The decoy has a body 60 and a movement system 70 for causing the decoy to move. The movement system 70 comprises guide means 74 connected to the body 60 and drive means 76 for driving the guide means so as to impart movement to the body in at least two directions simultaneously.

In order to further elucidate the scope of the present invention, a number of non-limiting exemplary embodiments of the invention will be described with reference to the accompanying drawings.

In the preferred embodiment of this invention, the guide means 74 comprises a guide element 10 and a guide track 20.

Figure 1:
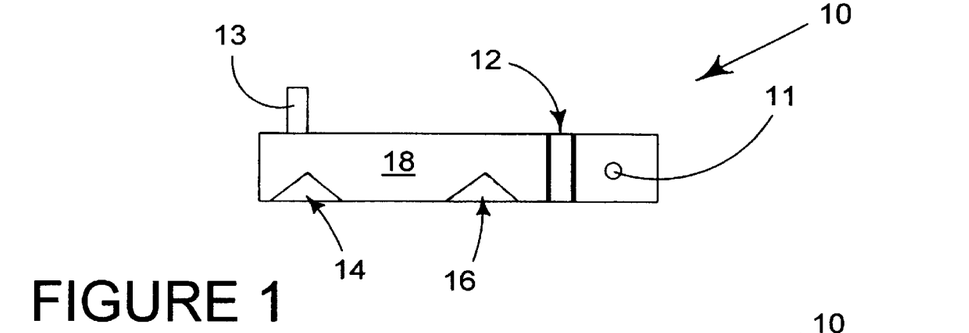
FIGS. 1 and 2 are side and plan views respectively of a guide element of the movement system for a decoy.
Figure 2:
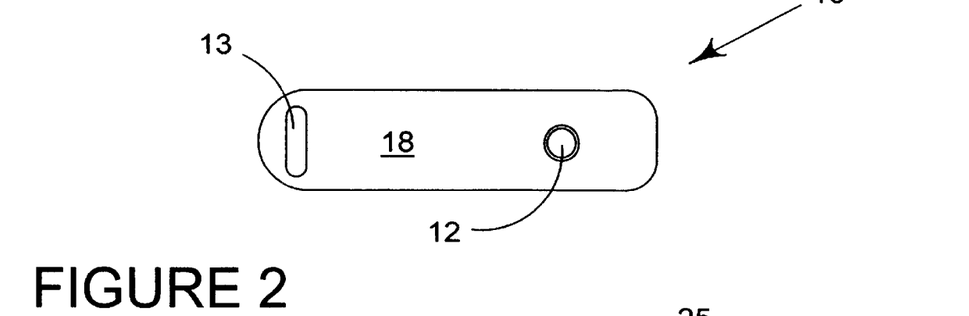

FIGS. 1 and 2 illustrate one embodiment of the guide element which comprises an arm 18, optionally, with an aperture 12 defined between the upper and lower surfaces of the guide element 10. Suitable engaging means, for example a pin 13 protrudes from the upper surface of the guide element 10; in use the pin allows the movement system 70, when assembled, to be fitted to the body shell 60 for the decoy.

Figure 3:
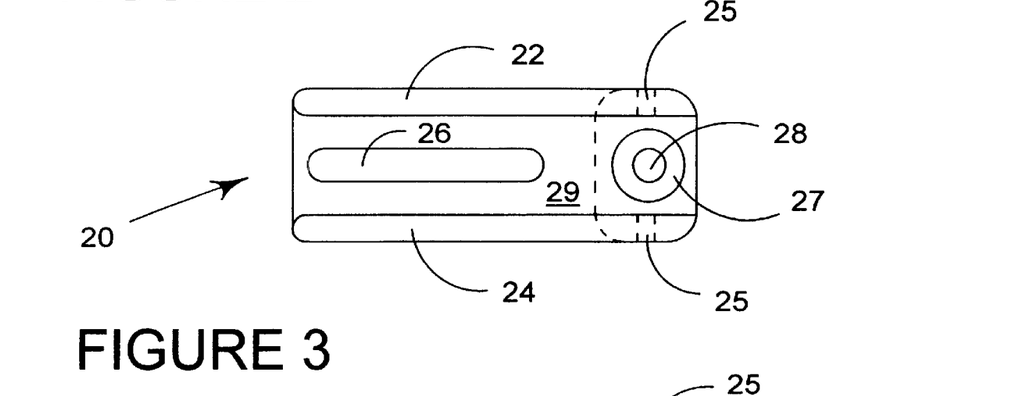
FIGS. 3 and 4 are plan and side views respectively of a track apparatus of the movement system for a decoy.
Figure 4:
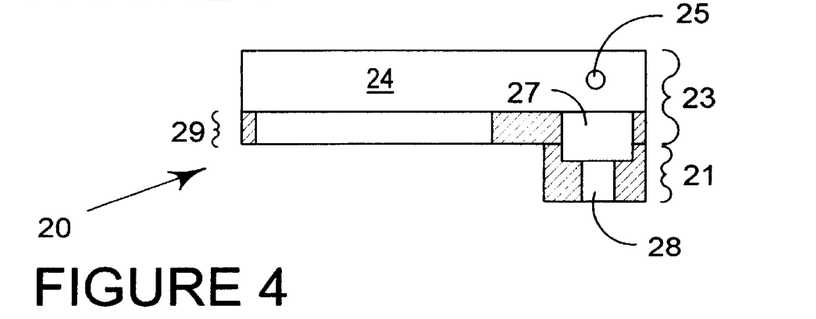

FIGS. 3 and 4 show one embodiment of guide track 20, which comprises an upper portion 23 and a lower portion 21 connected to each other. The lower portion 21 includes a pivotal connection provided, in part, by a vertical aperture 28. The upper portion 23 comprises a track 29 for receiving the guide element 10; the track has defined in it a vertical aperture 27, aligned with aperture 28 which is adapted to receive fixing means to form the pivot. In one class of embodiments, the track further comprises a slot 26 which is adapted to receive the pin 50 of the drive means 76 described in more detail below. The upper portion 23 further comprises a pair of side wall panels 22 and 24, disposed either side of the track 29 to retain the guide element 10 within the guide track.

In some embodiments, a horizontal aperture 25 is defined in each side wall panel 22 and 24 of the guide track 20 and there is a corresponding aperture 11 struck from the guide element 10 be aligned with aperture 25 and to receive suitable fixing means to form a pivot connection between the guide track 20 and guide element 10.

In other embodiments the guide track 20 is so constructed and arranged as to allow the guide element 10 to move back and forth in the directions P as the pin 50 is engaged in the aperture 12 and is driven by the drive means.

Figure 5:
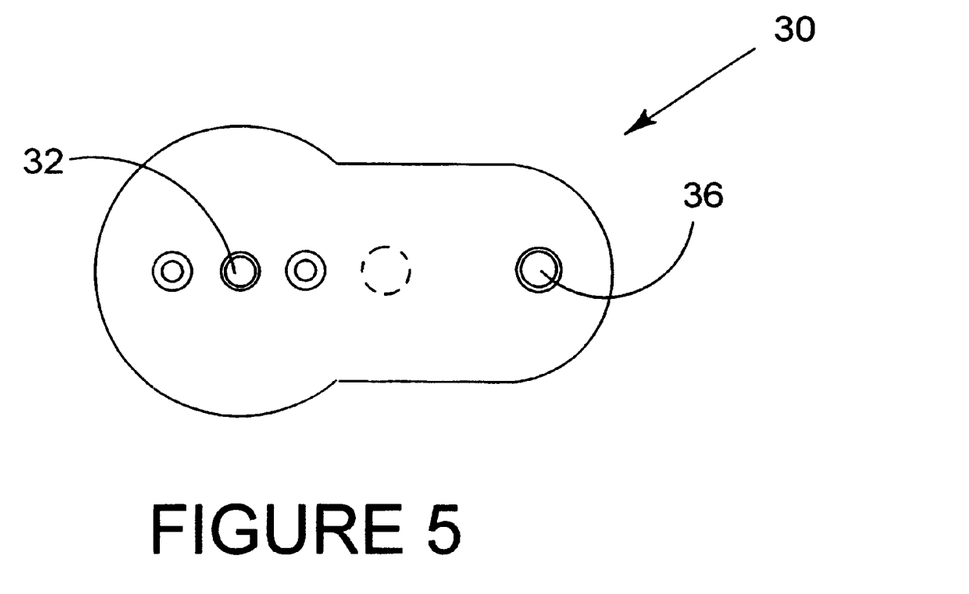
FIG. 5 is a plan view of the motor housing of the drive means.
Figure 6:
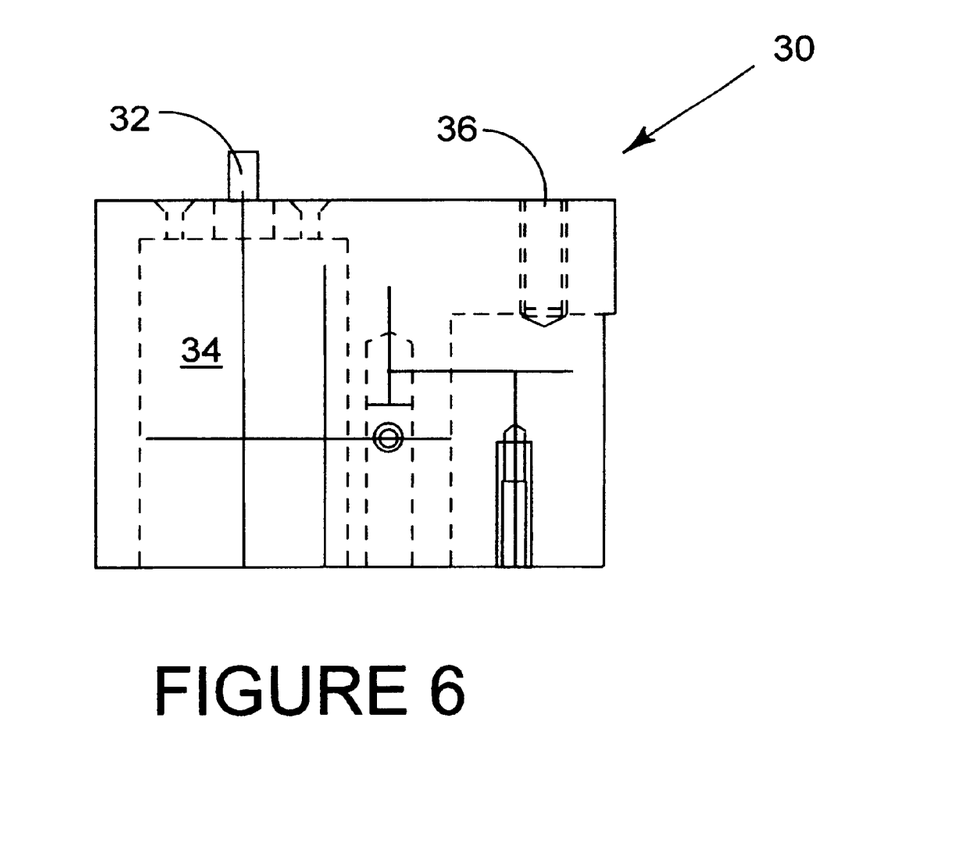
FIG. 6 is a cut-away side-on view of the motor housing as shown in FIG. 5.

FIGS. 5 and 6 show the housing 30 for the drive means 76. In this embodiment, the housing is provided with a recess to receive an electric motor 34 in such a way that the motor's drive shaft 32 protrudes from the upper surface of the motor housing 30. The motor is powered by a battery within the housing or more commonly a 12 v battery positioned remote from the decoy and a suitable switching assembly. The motor is rated to provide a low rotary speed, for example 12–20 rpm. A aperture 36 is formed in the motor housing to provide a pivotal connection between the guide means 74 and the motor housing 30.

Figure 7:
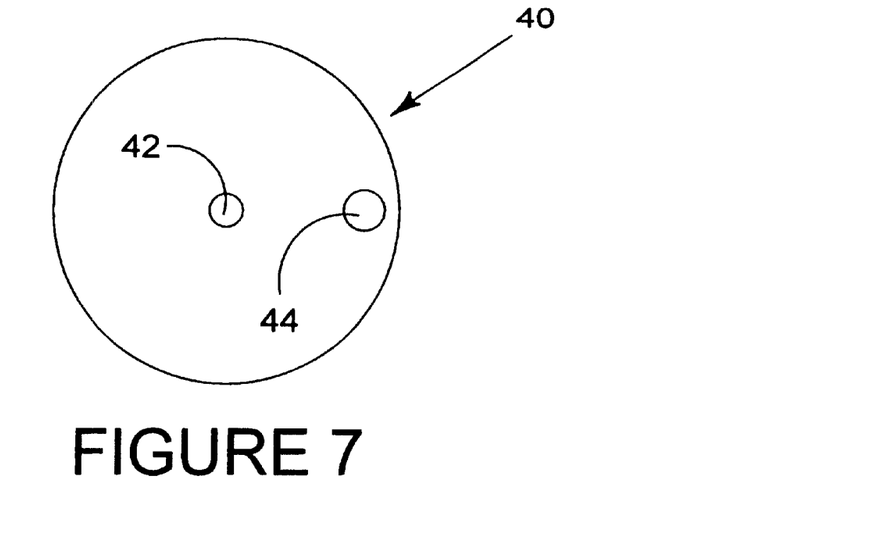
FIGS. 7 and 8 are plan and side views respectively of a rotary disc component of the drive means.
Figure 8:
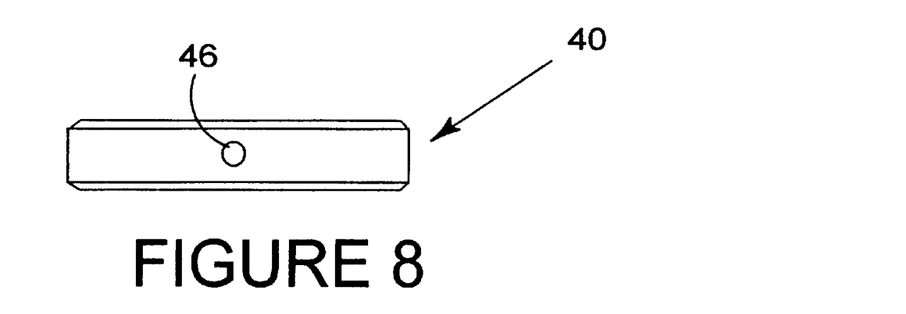
Figure 9:
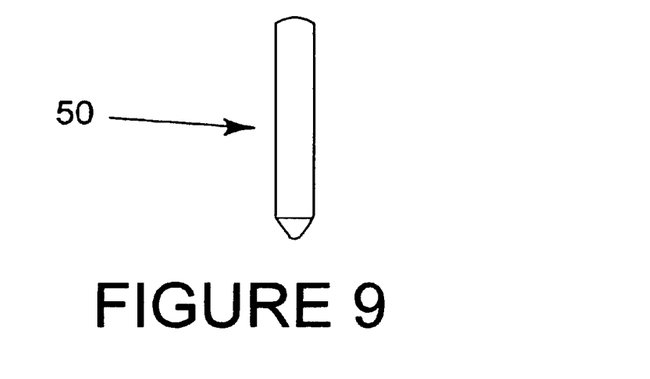
FIG. 9 is a side view of the pin element for use with the rotary disc.

In order to convert a rotary motion from the drive means to movement to drive the guide means, means to offset the output motion is provided. In this embodiment there comprises a rotary disc 40, and pin 50 which is mounted proximate the outer part of the disc to offset the drive, as shown in FIGS. 7, 8 and 9. The pin 50 is fitted to the disc through aperture 44. In other embodiments, the same effect is provided by making the drive shaft 'dog leg' in shape.

Defined at the centre of the disc 40 is an aperture 42, formed to cooperate with the drive-shaft 32 of the motor 34: when the rotary disc 40 is placed on the upper surface of the motor housing 30 in such a way that the aperture 42 accepts the motor drive shaft 32, and the motor is engaged, the rotary disc component 40 may rotate in the direction R. The disc 40 is secured to the drive shaft by suitable securing means, for example a grub screw positioned in aperture 46.

The guide means 74 and housing 30 is made from suitable plastics material so as to be light in weight and durable.

The movement system 70 is simple to manufacture and is achieved by mounting the motor in the housing 30 then securing the disc 40 to the drive shaft 32 so that it may be rotated in the direction R by engagement of the motor 34. The pin 50 is inserted into the recess or aperture 44 and secured thereto. The direction R is shown in the figures as a clockwise rotation, through it is envisaged that an anti-clockwise rotation may equally be applied, to the same effect, to the rotary disc 40.

To complete construction of the movement system 70, the guide track 20 is, in this embodiment, pivotally connected to the motor housing 30 by suitable known fixing means secured to the housing, through apertures 28 and 36. The drive pin 50 is received by the slot 26 to protrude there though above the track 29.

Figure 10:
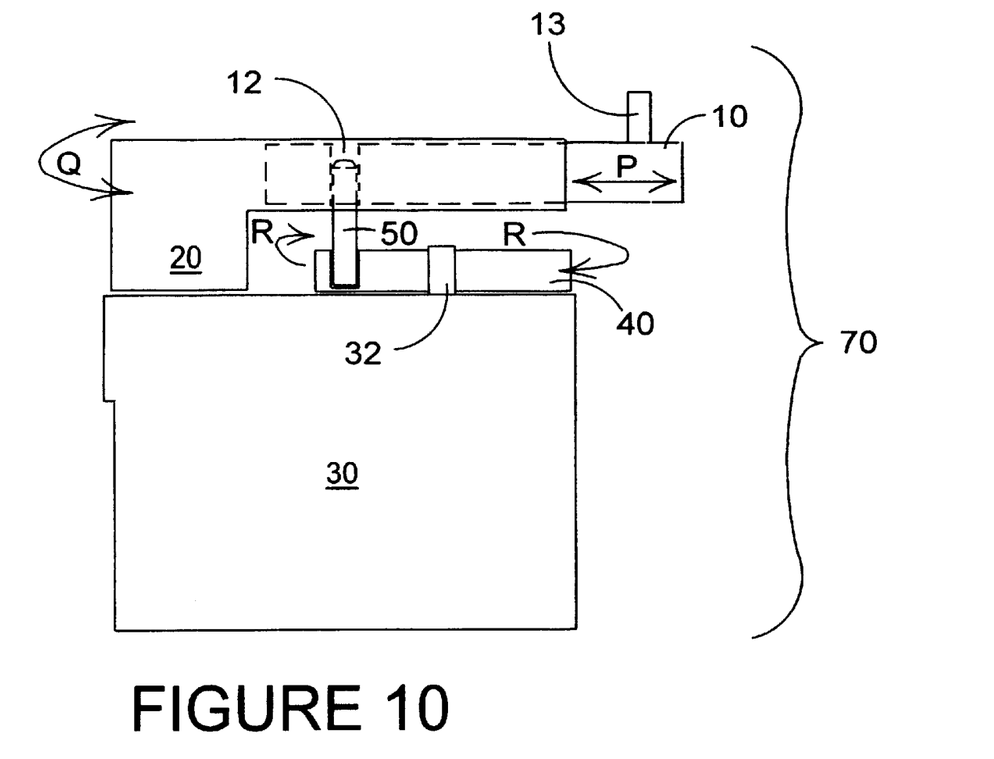
FIG. 10 is a side view of the assembled movement system for the decoy in a first embodiment.

When the drive means is switched on the rotary disc will rotate which will cause pin to rotate. The rotary movement of the pin 50 is converted to an oscillatory motion as it is moves to and fro within the slot 26. As the guide track 20 is pivotally connected to the housing 30, it will oscillate from side to side in the directions Q (FIGS. 10 and 11) as the rotary disc 40 rotates: thus the guide track 20 moves in a first direction and then returns as the pin 50 moves through 360 degrees.

In the first embodiment the pin 50 is engaged in aperture 12 of the guide element 10 to move it back and forth in the directions P within the track aperture 26. Oscillations back and forth are achieved by the tracing of such a path in the slot 26 by the pin element 50, as the rotary disc 40 rotates.

Figure 11:
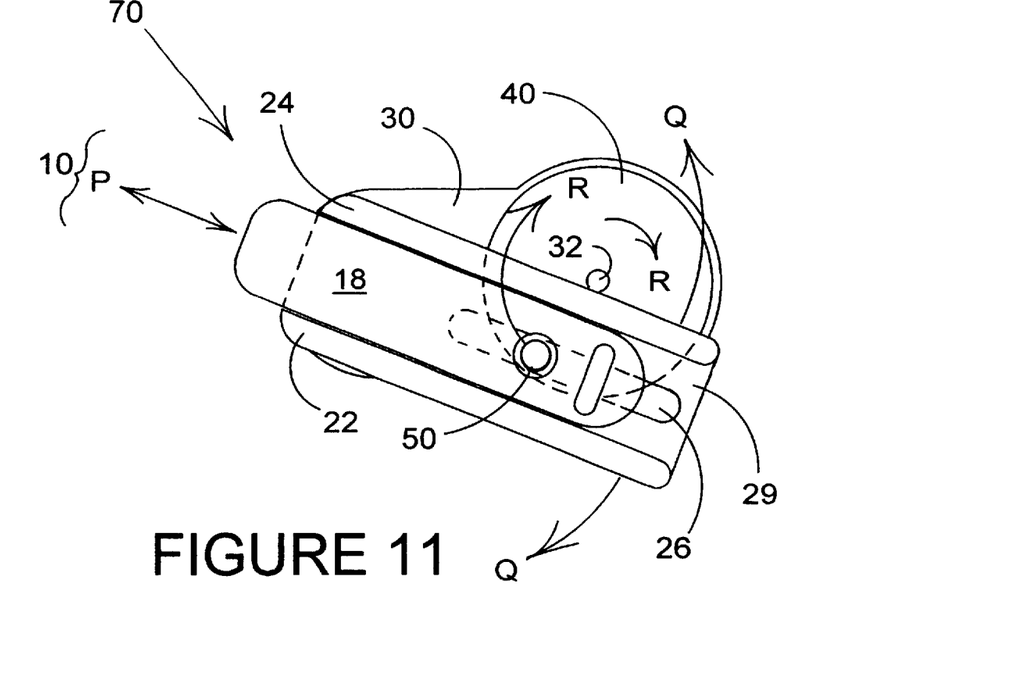
FIG. 11 is a plan view of the assembled movement system as shown in FIG. 10.

The combination of movement for the guide track 20 and the guide element 20 of the first embodiment is illustrated in FIG. 11.

Figure 12:
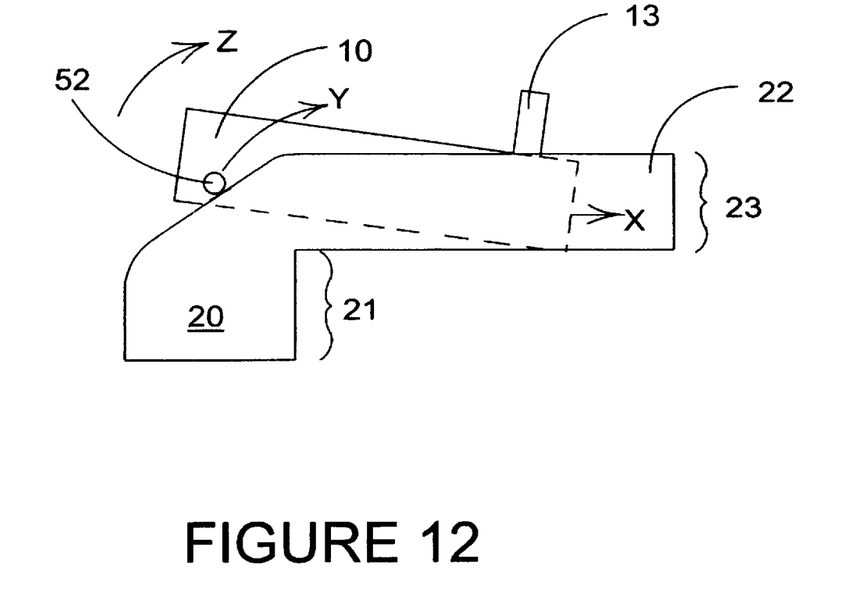
FIG. 12 is a side view of the guide element and guide track for a second embodiment of the invention.

In a second embodiment of this invention, part of the side walls 22 and 24 of the track apparatus 20 is cut away as is illustrated in FIG. 12. A protruding portion, for example a pin 52 is inserted into the horizontal aperture 11, which is of a length greater than the distance between the side wall panels 22 and 24. It is so arranged as to allow part of the guide element to move relative the guide track. In this embodiment the protruding portion is towards the rear of the guide element 10 to trace a path following the side walls 22 and 24. It will be seen from FIG. 12 that the side walls 22 and 24 are truncated, so as to enable the rear part of the guide element to move in the direction Y as it is moved forward in the direction X.

This arrangement imparts a diving or feeding motion, by moving the rear portion of the body shell 60 in the direction Z, relative to the rest of the body shell 60.

Figure 13:
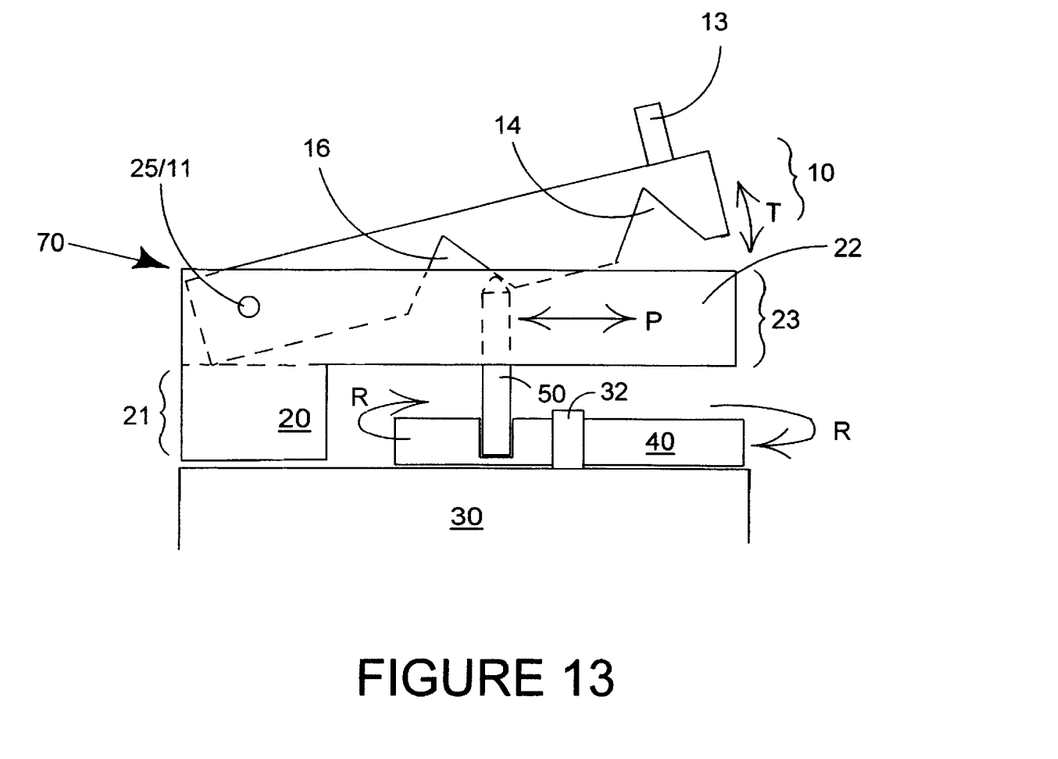
FIG. 13 is a movement system, according to a third embodiment of this invention.

In a third embodiment of this invention, the lower surface of the guide element 10 includes a linear cam-track, with, optionally, a non-uniform profile. FIG. 1 illustrates such an example in which the cam-track comprises a series of apertures or recesses 14 and 16. The guide element 10 is pivotally connected to the track apparatus by pivotal fastening means through the aligned apertures 25 and 11. In this embodiment, as the pin 50 traces an oscillatory path back and forth within the track aperture 26, it also cooperates with the cam of the guide element 10 in a cam and follower arrangement. Thus, the recesses 14, 16 impart a vertical "nodding" motion in the directions T to the decoy's body shell 60. This embodiment is illustrated in FIG. 13.

In a still further embodiment of the present invention, the side wall panels 22 and 24 comprise on their upper surfaces a toothed rack for the engagement of a pinion or cog arrangement, to convert the linear oscillation, in the directions P, of the pin 50 in the slot 26 to rotary motion of appendages to the body shell 60, for example wings.

In another embodiment, the movement system is mounted on means 72 to allow a decoy comprising that movement system to stand on solid ground. Alternatively, a further embodiment includes flotation means to allow a decoy comprising the movement system of the present invention to operate on water.

The present invention and its preferred embodiments provide a decoy which is capable of moving in a four axis, a five axis or a six axis movements and using a common design of guide means and drive means. It is envisaged that the movement system can be applied to a variety of decoy bodies, for example pigeon, duck, goose or turkey, without departing from the scope of invention.

Furthermore, the flexibility of the system allows for different movement types to be applied for different decoy bodies according to particular user requirements The movement systems are able to be supplied new or to be fitted to existing decoy bodies on a retrofit basis.

What is claimed is:

1. A decoy having a body and a movement system for causing the decoy to move, the movement system comprising guide means connected to the body and drive means for driving the guide means so as to impart movement to the body in at least two directions simultaneously;

wherein the guide means comprises a guide element and a guide track for receiving the element, wherein the drive means is adapted to drive the guide track and guide element;

wherein the drive means comprises a rotary motor and an output arm adapted to be received by the guide track, whereby the rotary motion of the arm imparts a linear motion to the guide track;

wherein the guide track further comprises a slot for receiving the output arm to protrude there through to cause the guide element to move relative to the guide track; and wherein the output arm is engaged by the guide element to cause it to move to and fro along the guide track.

2. A decoy as claimed in claim 1 wherein the guide element further comprises a protruding portion extending transversely and adapted move along an edge of the guide track, the edge is profiled to cause the protruding portion and part of the guide element to move relative the guide track in a direction corresponding to the profile.

3. A decoy as claimed in claim 2 wherein the protruding portion is positioned to the rear of the guide element and the edge is profiled to cause the rear of the guide element to rise relative the front of the guide element as it moves towards the front of the guide track and to be lowered in the return direction so as to simulate a feeding motion for the body.

4. A decoy as claimed in claim 3 wherein the decoy further comprises wings connected to the body, and the guide element further comprises a toothed rack to engage a cog arrangement secured to the guide track and connecting the wings to cause them to move.

* * * * *